United States Patent
Sims, Jr. et al.

[15] 3,704,337
[45] Nov. 28, 1972

[54] TACTILE RESPONSE TEACHING SYSTEM

[72] Inventors: John C. Sims, Jr., Sudbury; Lloyd D. Brace, Jr., Concord, both of Mass.

[73] Assignee: Information Transfer Corporation, Wellesley, Mass.

[22] Filed: April 7, 1969

[21] Appl. No.: 813,930

[52] U.S. Cl. .................................35/9 R, 35/35 C
[51] Int. Cl. ...........................................G09b 7/04
[58] Field of Search..........................35/9, 35.3, 8 A

[56] References Cited

UNITED STATES PATENTS

| | | |
|---|---|---|
| 3,371,933 | 3/1968 | Weitzner...............35/8 A UX |
| 3,487,558 | 1/1970 | Golden et al.................35/9 R |
| 3,516,176 | 6/1970 | Cleary et al..................35/9 R |
| 3,522,664 | 8/1970 | Lambright et al............35/8 R |
| 3,106,027 | 10/1963 | Thelen............................35/9 |

*Primary Examiner*—Wm. H. Grieb

[57] ABSTRACT

A teaching system for supplying visual and audible teaching information to a student in a teaching sequence determined by the tactile response of the student to the audible information, comprising a machine actuable to sequentially feed a sequence of cards from a supply station to a viewing station and then back to the supply station. The cards bear printed visible choice fields on one side, and, on the opposite side, printed circuits and recorded audible sound tracks. There is a platen on the machine adapted to cooperate with printed circuits on a card in viewing position. Interposed between the card and the platen is a compressible mask operable by a student's finger touching a choice point on the choice field to deform and permit a connection between a selected choice point on the card and the platen. There is programmable apparatus in the machine for reproducing audible tracks on a card in viewing position in a sequence determined by a program established by the printed circuits on the card in position.

15 Claims, 11 Drawing Figures

PATENTED NOV 28 1972 3,704,337

INVENTORS
JOHN C. SIMS JR.
LLOYD D. BRACE JR.
BY
Kenway, Jenney & Hildreth
ATTORNEYS INVENTORS
JOHN C. SIMS JR.
LLOYD D. BRACE JR.
BY
Kenway, Jenney & Hildreth
ATTORNEYS

INVENTORS
JOHN C. SIMS JR.
LLOYD D. BRACE JR.

TACTILE RESPONSE TEACHING SYSTEM

BACKGROUND OF THE INVENTION

Our invention relates to teaching machines, and particularly to a novel teaching system in which the stimulus-response pattern is greatly simplified.

Many forms of visual, audible and audio-visual devices have been developed in an attempt to reduce the need for personal supervision by an instructor in the teaching process. One form of apparatus that has been developed to facilitate the instruction of a student with a minimum of supervision is shown and described in U.S. Pat. 3,521,381 issued July 21, 1970, entitled Teaching Machine And Information Card Therefor, assigned to the assignee of our application. That apparatus comprises a teaching machine for use with a group of teaching cards. Each of the cards includes a first area bearing viewable information, a second area bearing reproducible audio tracks, and a third area bearing printed control circuit information. A stack of such cards is placed on the machine, and they are sequentially fed into a position in which the student can view the information on the card. The control information on each card completes a control circuit in the machine that is uniquely related to the viewable and reproducible information on that card. The machine includes plural switches adapted to be selectively activated by a magnetic pointer manipulated by the student, for reproducing appropriate audio tracks on the card being viewed, and for controlling the subsequent feeding of a further card into viewing position, as determined by the control information on the card being viewed and upon the response of the student to the audible instructions on the card. In operation the audio circuit associated with the machine can be arranged to initially play an audible instruction requesting the student to make a response with respect to this audible instruction and a visual area on the card. For example, the student may be asked with reference to specific visual patterns on the card to select one having a specific characteristic. This selection is done by the student using a magnetic pointer and placing the pointer on or near the visual selected area, thereby activating the magnetically controlled switch. If the response is correct, the machine may then play a second audio track, which might be an instruction with respect to further areas on the card. If the response is incorrect the same audio track may be recycled to repeat the instructions to the student.

BRIEF SUMMARY OF THE INVENTION

Broadly speaking, the present invention employs a teaching machine of the general description disclosed in the above cited copending application, in that it comprises means for sequentially moving teaching cards to a viewing position, means for reproducing audible information recorded on a card in the viewing position, and a set of control circuits for performing the operations necessary to move each card into and out of position and to selectively reproduce one of the several audio tracks recorded on the card. The teaching cards provided are generally similar to those described in the cited application, in that they include visible teaching areas, recorded audio information, and printed control circuits. The machine and cards of the present invention are, however, so formed that the student's response to the instruction given by the machine is accomplished by his touching that portion of the visual area which he selects as the correct response. The machine and the cards are so formed, that when the card is in the operating position, a student touching the appropriate area closes a switch by pressure contact, a portion of the switching being a conductive area on the reverse side of the card itself and the printed circuit on the card together with the circuit within the machine then produces continuation of the program by the machine, dependent upon the correctness of the student response. With this arrangement no wands or magnetic switches are required and the student response is suitable for students of a wide variety of ages and under a wide variety of conditions. Since the programming function is carried more completely and in a more directly related way on the card, the correlation in preparing the teaching card materials, with the circuitry and the visual materials is considerably simplified.

Basically, each teaching card comprises on one side one or more choice fields visibly marked into separate choice regions, each of which is disctinctively printed with a picture, word or other teaching message. Audible tracks on the card are actuable to direct the student's attention to a choice field and to direct a response which, if correct, will result in touching one choice region, or if incorrect will result in the touching of another choice region in the choice field. On the other side of the card, and corresponding in position to the choice regions, are one or more printed conductive elements that are directly connected to a set of printed circuits on the card. These printed circuits cooperate with a printed circuit platen and a set of point contacts or brushes on the machine to determine the program followed by the machine in operation.

The choice point contacts on each card, when it is in viewing position, overlie a resilient electrically insulating mask which is perforated at each location at which a choice point contact may be present on the card. Beneath the mask is a printed circuit platen which is connected to a selected choice point contact when the card over that contact is pressed by the student to indicate his choice. Depending on whether the choice is correct, incorrect or only partly correct, the circuit completed causes operation of the fixed circuits on the machine to take appropriate action to repeat the lesson, go forward to the next lesson, or branch to another card that is not necessarily the next in the sequence to carry out a teaching subroutine.

DESCRIPTION OF A PREFERRED EMBODIMENT

Figure 1:
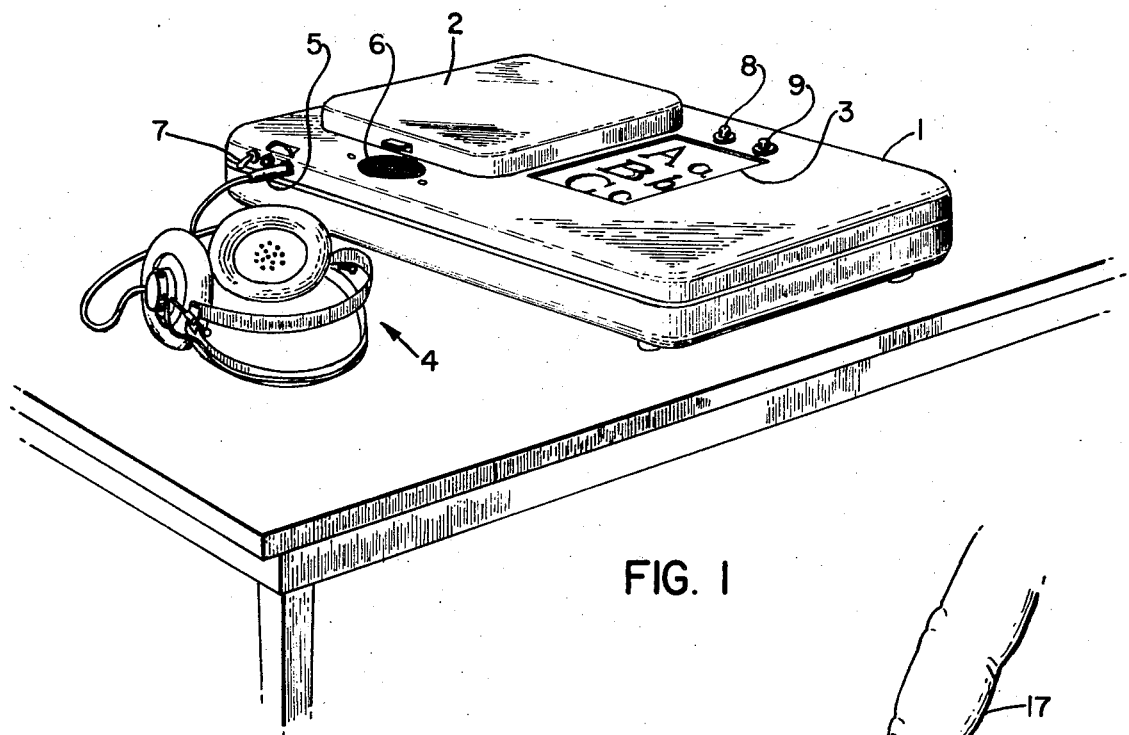
FIG. 1 is a perspective view of a teaching machine constructed in accordance with the principles of this invention.

Referring now to FIG. 1 a teaching machine in accordance with the invention comprises a housing 1 having a liftable cover 2 giving access to a supply or stack of teaching cards thereunder. The cards are fed from the card supply one by one to a position in front of the student where the illustrated portion of the card is visible through a window 3. When the card is in the viewing position the student may see the illustrated portion thereof and may touch certain portions of the card in response to questions in carrying out the program of instructions. As part of the instruction the student hears through headphones 4 connected by a jack 5 to the machine, or alternatively through a loud speaker 6, verbal instructions or other appropriate sounds. An on-off switch 7 is provided for putting the machine in operation and a light 8 is illuminated when the machine is turned on. A further light 9 is provided to signal the student when the machine is waiting for him to make a response.

Figure 3:
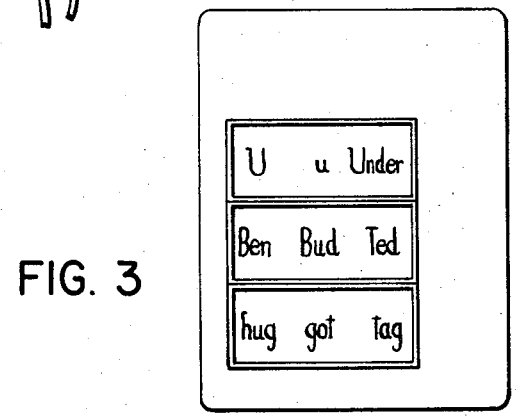
FIG. 3 is a plan view of one side of a teaching card constructed in accordance with the principles of this invention.
Figure 4:
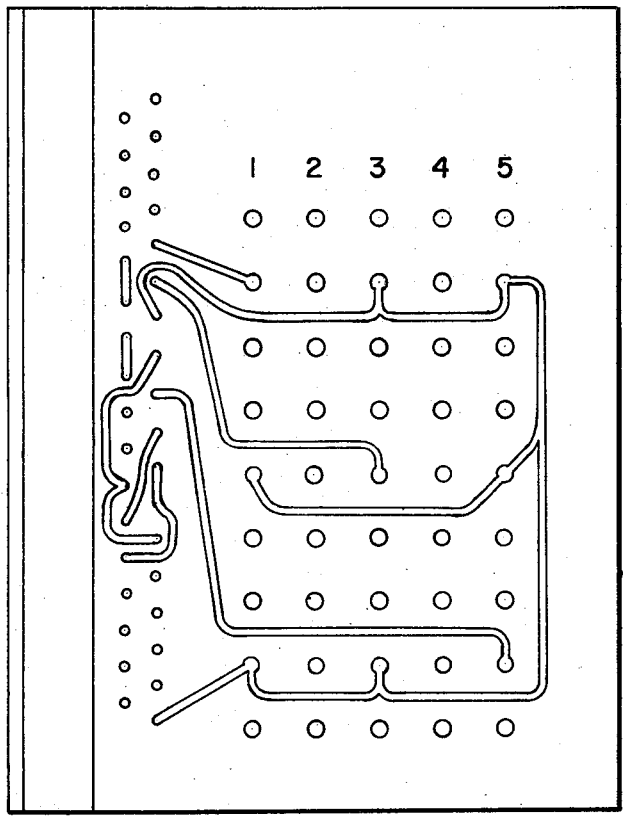
FIG. 4 is a plan view of the opposite side of the teaching card of FIG. 3.

In FIG. 3 is shown the illustrated side of one of our teaching cards. The particular card shown is programmed for the teaching of reading by the phonics method and is concerned in particular with the sound of the letter U. A plurality of such cards are loaded into the machine and presented one by one, each card having appropriate illustrations, and the student responding to the program by touching certain words, symbols or other graphic presentations in response to the visual stimulus on the front side of the card as shown in FIG. 3 and audio stimulus which he hears through the headphones or the loud speaker. In FIG. 4 is shown the reverse side of this same teaching card. The two principal features of the back of this card are a pattern of lines and dots which are imprinted on the card with a conducting ink together with a strip of magnetizable material also imprinted or applied to the back of the card on which can be recorded audio or sound messages. This card carries four independent sound tracks each having messages related to the visual materials printed on the face side of the card. The conducting lines on the back of the card interconnect specific points on the card. These points fall into two groups. A first group of 45 points is related to the view area of graphic illustrations imprinted on the face side of the card. A second group of 35 points are related to the electronic logic of the teaching machine itself. The pattern of lines determines the program of operations to be carried out for that particular card.

Each point of the group of 45 points falls directly behind specific locations or areas of the illustrated portion on the face side of the card. The group of 45 points are further subdivided into three sub groups; a sub group at the top, another sub group in the middle, and a third sub group at the bottom of the card. These points are therefore arranged in a basic 5 by 9 array and are further sub-divided into 3 groups each of 15 points in a 5 by 3 array.

For convenience of discussion we have labeled the top group C-1 the middle group C-2 and the bottom group C-3. In each sub-group the top row is labeled 1 the middle row 2 and the bottom row 3 and the columns labeled 1, 2, 3, 4 and 5. Thus the point C121 refers to a point in the top group C1 the middle row thereof and the first column.

In the particular program shown on this card only 9 of the total of 45 points are used. These 9 points fall directly behind each of the 9 letters or words which appear on the face side of the card.

The four sound tracks on the back of the card will be referred to for convenience as track 1, track 2, track 3 and track 4. On this particular card the four messages which are recorded on the back of the card are as follows: Track 1: Look at the top of this card. You see the capital U, the small letter $u$, and a word with the letter $u$ in it. Touch the word with the letter $u$ in it. Track 2: Look at the middle of this card. You see the words Ben, Bud and Ted. Touch the word with the letter $u$ in it. Track 3: Look at the bottom of this card; hug, got, tag. Touch the word with the letter $u$ in it. Track 4: Good! You touched the words with the letter $u$ in them. Now we're ready for the next card.

When this card with its illustration is fed out by the machine in front of the student, track number 1 automatically plays. The student responds correctly by touching the word "under". Referring to both FIGS. 3 and 4, which is arranged in mirror image fashion, being on the back of the card, it will be noted that C121 falls directly behind the word "under". When the student touches the word "under" it forms a signal connection from circuitry included in the base through point C121 to point 9 of the group of 35 points which are connected to the machine logic. In this case it causes track number 2 to play. The student on hearing the message of track 2 responds by touching the word Bud on the middle of the page and the conducting line from point C223 to point 11 now causes track 3 to play. On hearing the message of track 3, the student responds by touching the word "hug". The conducting line from point C325 to point 17 causes track number 4 to play. It will further be noted that all of the incorrect responses, that is, points C321, C232, C221, C225, C123 and C125 are interconnected and connect to points 11 and 35 of the control group. Correspondingly if the student touches the words "got", "tag", "Ben" or "Ted" or the big U or little u which are incorrect responses this causes the machine to go back to the beginning of the sequence starting with the playing of track 1.

It can be seen that a very large number of patterns and programs can be devised for this card system. Virtually any one of the 45 points or locations behind an illustration can correspond to a right answer or a wrong answer and can quite arbitrarily be made to cause any one of the four sound tracks to be played. As will become obvious when the detailed electronic logic is described, many ways of programming cards are possible including having the sound tracks follow each other in any desired sequence either automatically or in response to student operation of specified touch point locations.

Figure 2:
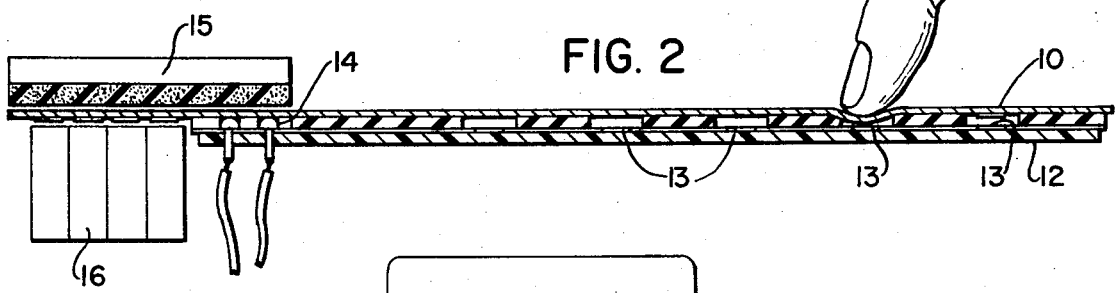
FIG. 2 is an illustration in cross sectional view of a portion of the machine of FIG. 1.

Each time the machine feeds a card out in front of the student, the card moves over a plate or platen. A cross section view of this is shown in FIG. 2. The platen 12 is formed of an electrically insulating material such as epoxy board and carries an array of electrical contact points, which may, for example, be brass rivets inserted into the board. The card 10, when in position is suspended or held over a compliant electrically insulating pad 11, formed of a material such as rubber. This pad holds the card away from the platen 12. The compliant pad is perforated with an array of 45 holes which are located in register with 45 electrical contact points 13 on platen 12 which align with the touch points on the card. Another set of platen contact points 14 are aligned with the 35 control points on the card. When the card comes into position, a bar 15 with a compliant pad moves to press the card against the contacts 14 and at the same time to press the recorded surface having the four sound tracks against four magnetic heads 16. The heads 16 are translated back and forth beneath the card in order to sense the recordings on the four sound tracks.

Figure 5:
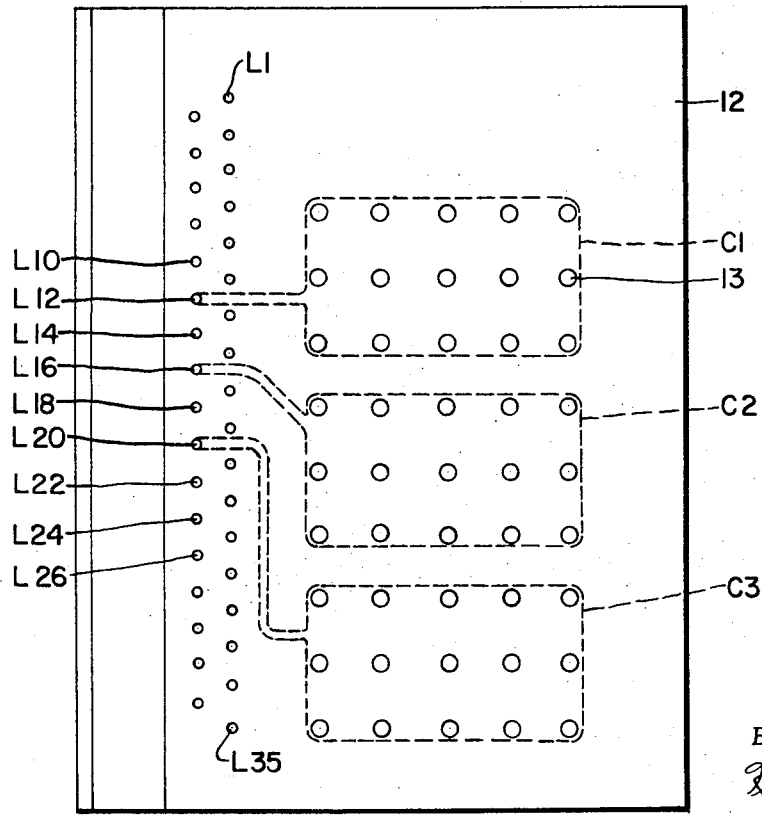
FIG. 5 is a plan view of the surface of a platen which forms a portion of the machine of FIG. 1.

When the student responds with his finger 17 by pressing on the card 10 the surface depresses so that a connection is made between the conducting pattern on the under side of the card and a contact 13. In this way the students tactile response with his finger directly completes an electrical circuit to cause a programmed operation to take place. A plan view of the platen 12 is shown in FIG. 5. On the top surface of the platen 12 are the conducting points 13 arranged in a 5 by 9 array and the conducting points 14 individually designated L1 through L35 which connect to the machine logic. A printed circuit pad C1 on the reverse side of the board 12 connects all of the conducting points 13 in the top group and by a printed line connects to the control contact L12. Similarly the middle group of points 13 connects by a pad C12 to the control point L16 and the bottom group connects by a pad C3 and a printed line to the control point L20. Before proceeding with a detailed description of the logic and operation of the machine a discussion will be given of the mechanism for handling and changing cards and of the mechanism for translating the heads back and forth beneath the card to read the sound tracks.

Figure 7:
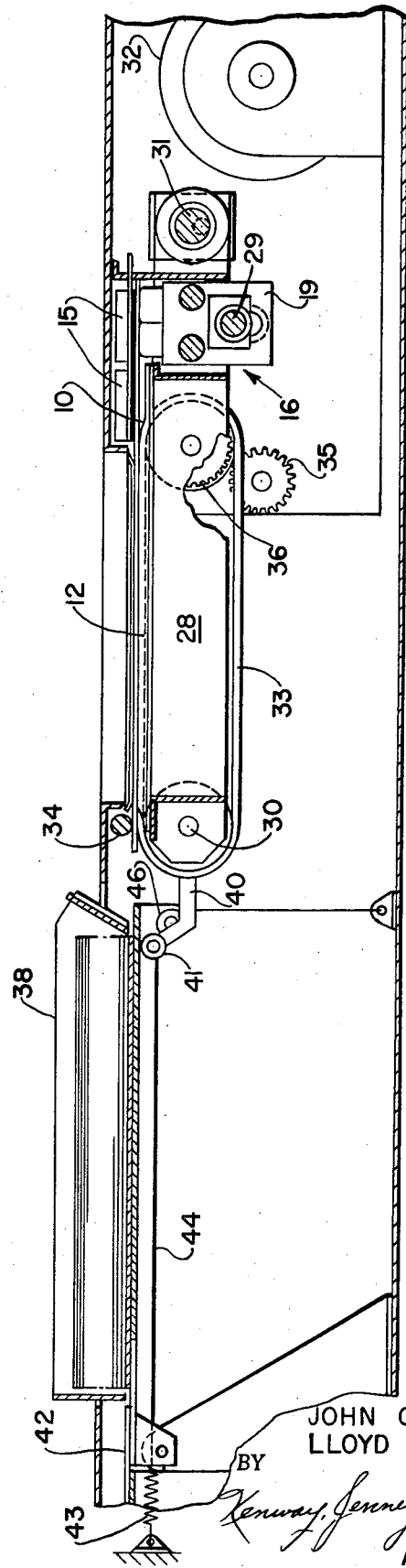
FIG. 7 is an illustration in side view of a portion of the operating mechanism of the machine of FIG. 1.

In FIG. 7 there is shown a sectional view of the machine. A card 10 is shown in position and a pressure pad 15 holds the card both against the contacts L1 through L35 and against the head 16 against its under surface. The audio head 16 moves back and forth supported by guide rods 18 and driven by a feed screw 29. The feed screw 29 engages a half nut 19 which is physically attached to the head assembly 16. The feed screw 29 is driven by a reversible main drive motor not shown. When the motor runs in a clockwise direction the heads move in one direction and when it moves in a counterclockwise direction the heads move in the other direction. In this way the heads are moved back and forth against the under surface of the card to engage and register with audio tracks recorded on its under surface. The card 10, the platen 12 and the head 16 are mounted and supported by a frame 28. This frame is pivoted at one end on a pivot 30 and supported at the other end by an eccentric shaft 31. This eccentric shaft 31 is operated by a motor 32 which, as it rotates the eccentric shaft 31, causes that end of the assembly to move vertically. In FIG. 7 this frame is shown in its upper or closed position. In this position the heads are in engagement with the card and the card is pushed against both the heads and the logic contacts by the pad 15. Also in this position the feed screw 29 is in engagement with the half nut 19. When in the machine the card is supported by a pair of rubber belts in friction engagement with the edge of the card and held in engagement by a pinch roller 34.

Figure 8:
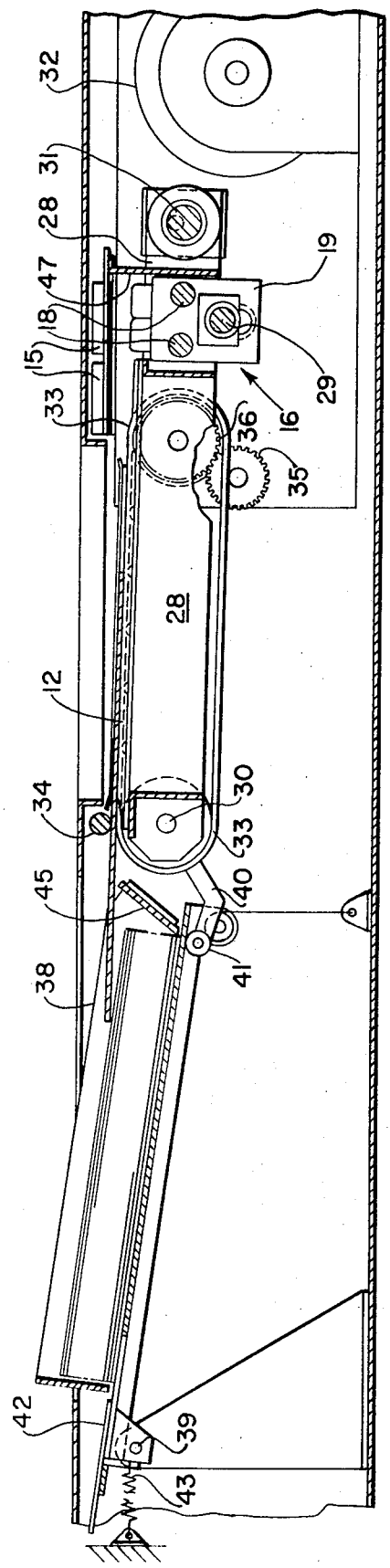
FIG. 8 is a side view of the same portion of the mechanism as is illustrated in FIG. 7, however, in a different operating position.

Referring now to FIG. 8 the mechanism is shown in the act of removing a card from the working area of the machine. In performing this operation the motor 32 is first operated to rotate the cam 31 so as to move the heads and control contacts and the card away from the pad 15 by lowering that end of the mechanism. This releases the card for the changing operation. Once the platen frame 28 is open and the card is released the main drive motor (not shown) can be energized again to cause the card 10 to be fed out. This operation is performed as a result of the engagement of gears 35 and 36 which, in FIG. 7 were disengaged when the platen assembly was closed but when the platen assembly opens and moves down these two gears come into mesh. The gear 35 is on a shaft which is also driven by the main drive motor. In order to remove a card the drive motor runs in one direction and in turning in that direction causes the card to move out and back into the card stack.

Figure 9:
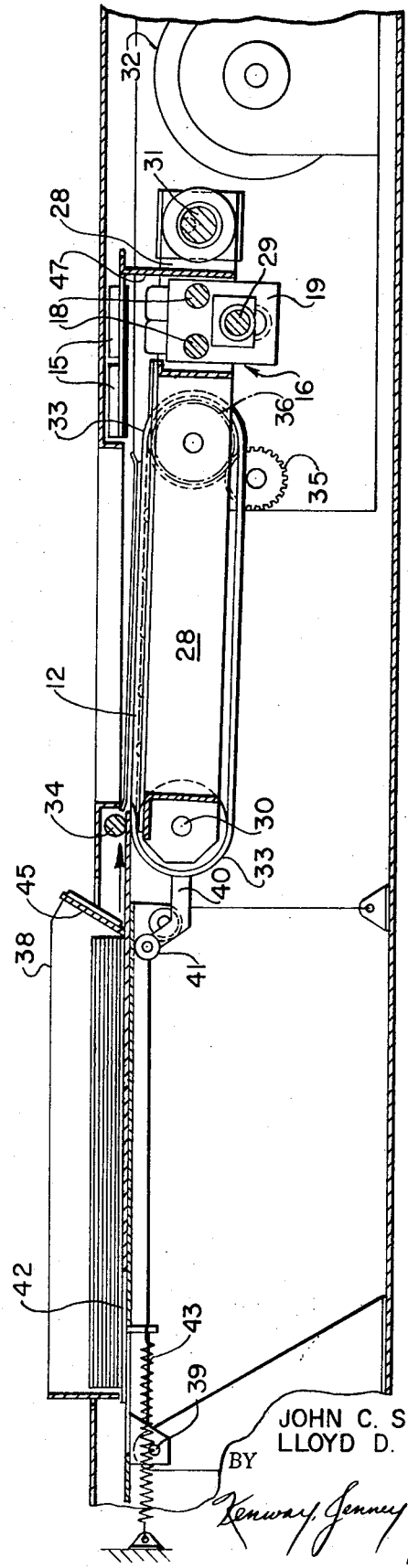
FIG. 9 is a third illustration in side view of the same portion of the mechanism illustrated in FIG. 7, however, in a third operating position.

The program of cards is placed in a box 38 which is pivoted at one end on a pivot 39 and at the other end is supported by a link 40 which pivots at one end on the main pivot 30 and on the other end by the main pivot point 41. The pivot 30 is actually a rotating shaft which is associated with the drive belts 33 which are transporting the card in. Accordingly, the operation of removing a card from the operating position causes this shaft to turn in a counterclockwise direction. The link 40 is connected to the shaft 30 through a friction clutch arrangement. Therefore when the shaft 30 turns in a counterclockwise direction at the time the card is being removed from the operating position, the friction of the clutches causes the front end of the box to move downward so that the card goes over the top of the front edge of the box to fall on top of the stack of cards in that box. As soon as the card has been fed all the way out into the box, the drive motor reverses and a consequence of the reversal of the drive motor is that the front edge of the box 38 is caused to lift up as shown in FIG. 9. The reversal of the drive motor causes the shaft 30 now to turn in a clockwise direction so that transport belts 33 are moving to feed a card into the work station and the friction of the clutches on the arm 40 causes the front edge of the box to rise.

At the back of the box 38 is a picker knife 42 which is a flat sheet of material slightly thinner than the thickness of one card. It is mounted in a manner such that it can move back and forth, being pulled back by a spring 43 and pulled forward by a cable 44 which passes from the picker knife over a pulley 46 and thence to the frame of the machine. It will be noted in FIG. 8 that when the front of the box 38 is in its lower position the cable is relaxed and the picker knife 42 is all the way back. When the box 38 rises the cable 44 is tensioned to pull the picker knife 42 forward. As the picker knife 42 moves forward it pushes the edge of the lowest card forward.

The front of the box 38 has a gate 45. The gate consists of a piece of metal which extends from the top almost to the bottom of the box such that a slit exists which is a little wider than one card thickness. When the picker knife 42 moves forward and pushes the bottom card, this card can move underneath the gate 45 toward the working position of the machine. The next-to-bottom card however cannot pass through this gate and therefore remains in the box. As soon as the card 10, i.e. the bottom card, has been pushed forward sufficiently out of the box it runs beneath pinch roller 34 and is frictionally engaged with the belt 33 to cause it to continue to move forward out of the box and fully into the operating position. When the card is fully in position its leading edge runs into a final barrier 47 and the arrival of the leading edge of the card at that barrier signals the machine that the card is fully in place.

In summary, then, the operation of changing a card constitutes a first operation of the motor 32 to cause the platen assembly to move downward disengaging the feed screw from the head and engaging the gears 35 and 36 to cause the card transport to operate. Operation of the main drive motor then causes a card in the operating position first to be fed out over the top gate 45 into the box 38 and then, on reversal of this motor, the lifting of the front edge of the box 38, motion of the picker knife and feeding of a card beneath the pinch roller 34 so that it is driven into the working position and against the barrier 47. Subsequent operation of the motor 32 to operate the cam causes the assembly to return to the original position as shown in FIG. 7.

These operations are all controlled by the machine logic and through the medium of switches which detect the presence of the card at the barrier when it is in the operating position and the absence of the card from beneath the pinch roller when it has gone and further switches to detect whether the platen assembly is open or closed. Similar switches are used to detect the location of the head assembly as it moves between its two extreme positions which in our logic are referred to as the "away" position and as the "home" position.

Figure 6:
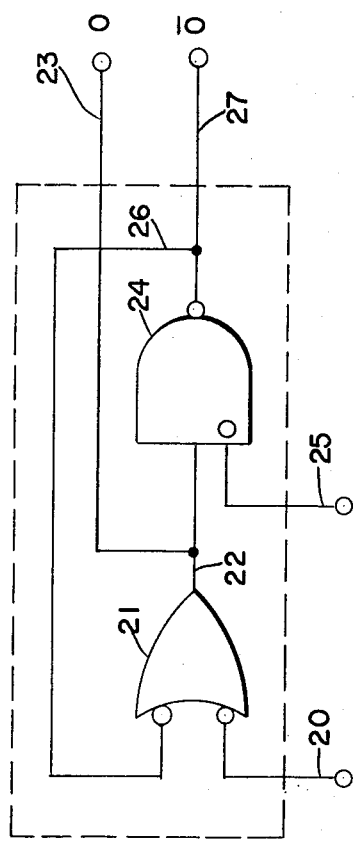
FIG. 6 is an illustration in block diagrammatic form of a logical sub-element used in the logical circuitry of the machine of FIG. 1.
Figure 10:
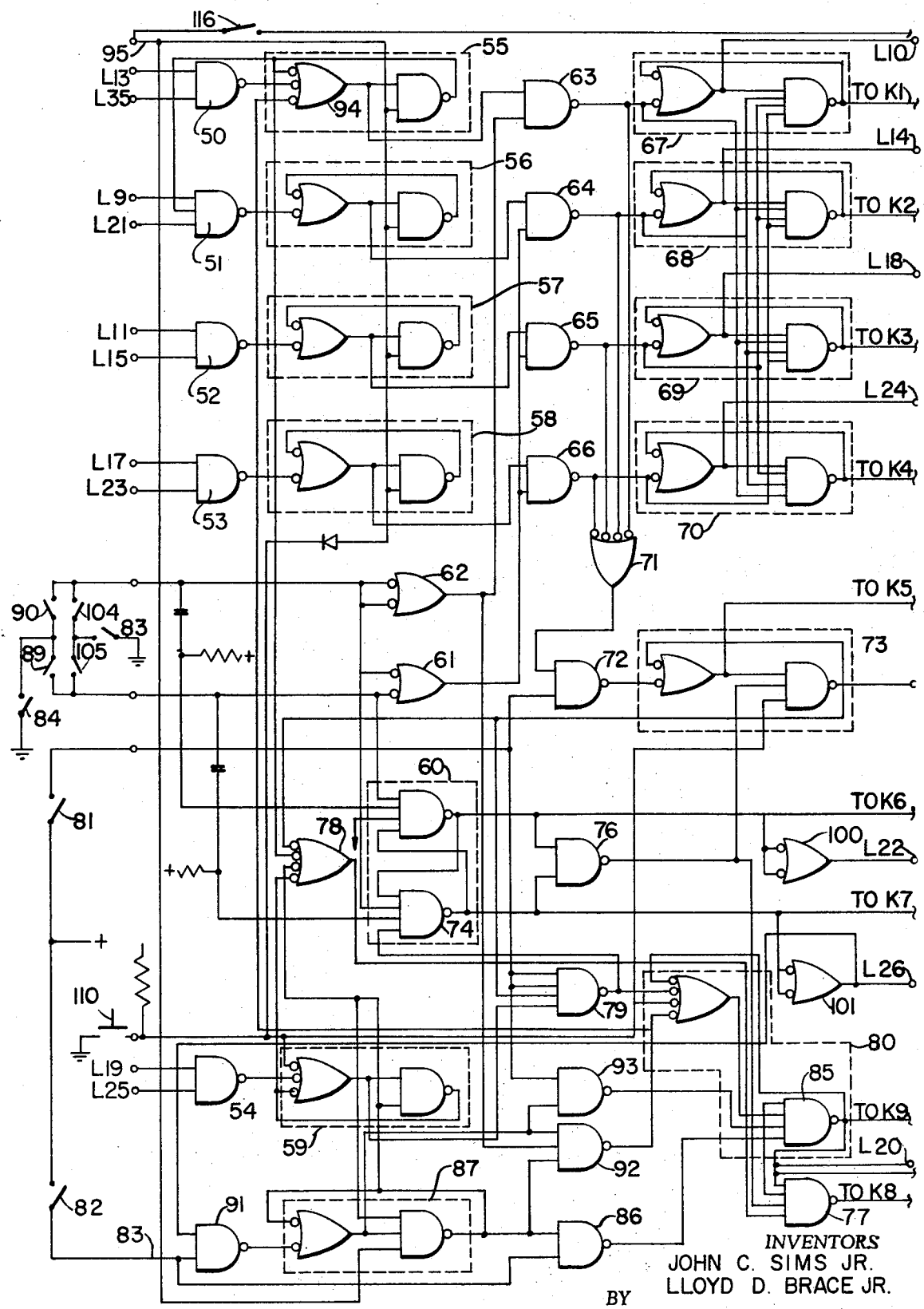
FIG. 10 is an illustration partially in block diagrammatic and partially in schematic form of a portion of a logic and control circuit for use in the practice of this invention.
Figure 11:
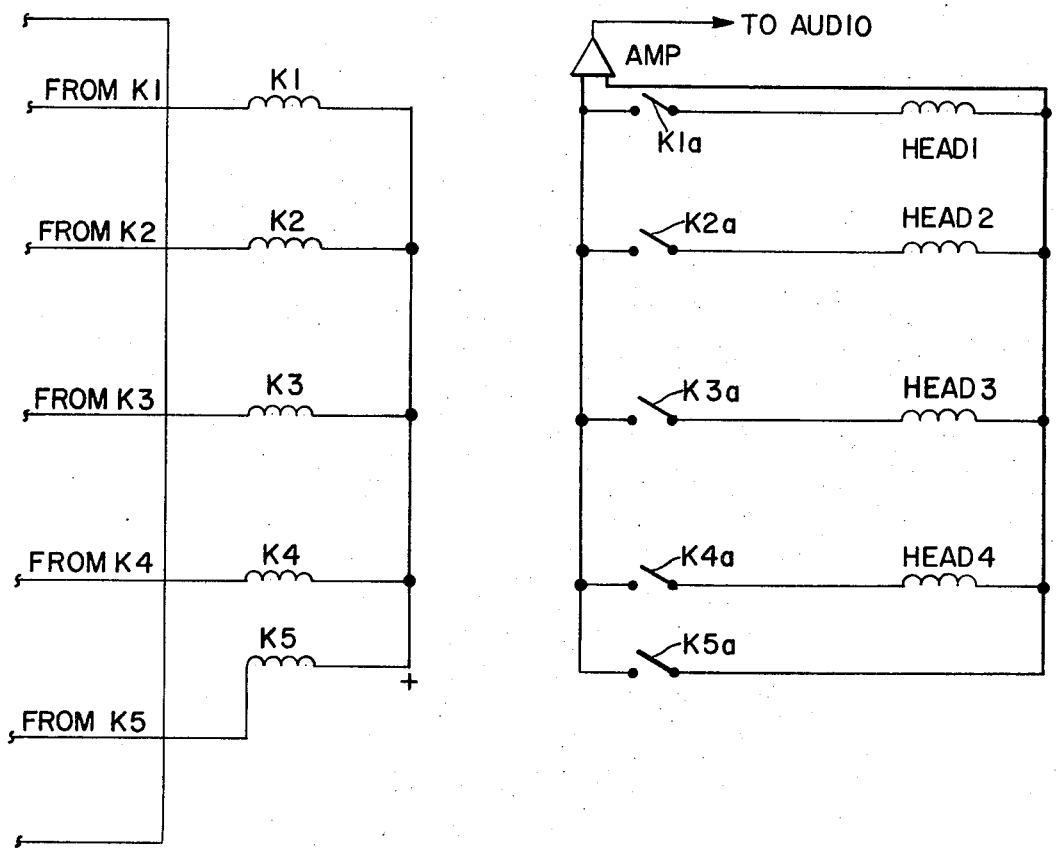
FIG. 11 is an illustration of the remaining portion of the circuit of FIG. 10.
Figure 11:
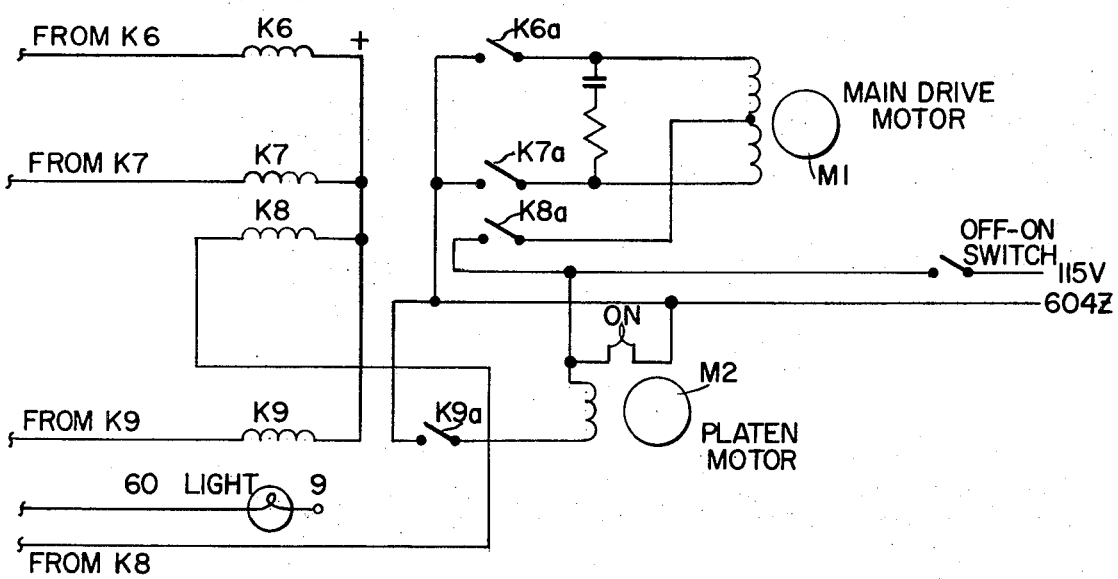

FIG. 10 is a combined logic and schematic diagram of the control electronics of the machine. All input signals to this logic diagram are on the left hand side and all output signals are on the right hand side. The machine uses a number of flip-flops combined with logical and and/or elements to perform the machine functions. The various states or operations of the machine are established by setting or resetting the various flip-flops which determine what machine functions are to be activated. In FIG. 6 a typical such flip-flop is shown. Each flip-flop consists of an OR element and an AND element built up out of so called NAND or "not-AND" logical elements. Each flip-flop has one or more set inputs and a reset inputs and an output Q and $\overline{Q}$. A set input 20 in the form of a logical zero or zero volts will cause the input logical OR 21 to produce a logic one output on line 22. This logic one also appears at the output terminal Q labelled 23. The signal appears at the input to the logical AND 24 which if its reset input 25 is a logical one allows a logic zero condition to be established on line 26. The presence of this logic zero at the input to the OR 21 causes the two elements to lock up in a state such that the logic one output remains on the line 23 and a logic zero appears on the output $\overline{Q}$ at terminal 27. If at some later time logic zero is applied to the reset input 25 this causes the output of element 24, as appearing on line 26, to go to a logic 1 and if the set input 20 to the element 21 is also a logic one, a logic zero will appear on line 22 and output line 23 and the output 27 will go to a logical 1. Thus the element 21 and 24 wired in this configuration constitute an electronic latch which can be set and reset at will. The logical symbols used in this and other diagrams are according to military standard 806B.

The principal operating sequences of the machine are controlled by five AND gates 50, 51, 52, 53 and 54. The gate 50 which receives signals from contacts L13 and L35 of the platen gives a logic zero output at its terminal 3 when both inputs 13 and 35 are logic one. Such an operation was discussed earlier in connection with FIG. 4 when an incorrect response by the student to one of the wrong touch points caused signals to be applied to the terminals 13 and 35 to cause the system to go back and start the sequence over again from track 1. Thus the function of the gate 50 is to set in motion an operation called "repeat from track 1". The gate 51 is used to cause the machine to play audio track number 2. This takes place when two logic one signals, one at L9 and the other at L21 are applied to the input of the gate 51 to cause its terminal 6 to assume a logic zero output. Similarly the gate 52 receiving inputs from L11 and L15 selects track 3 and the gate 53 with inputs from L17 and L23 selects track 4. When each of the input gates just described gives a logic zero output to set in motion a particular machine function it sets a corresponding latch. Thus an output from the gate 50 sets the latch 55, an output from the gate 51 sets the latch 56, an output from the gate 52 sets the latch 57, an output from the gate 53 sets the latch 58 and an output from the gate 54 sets the latch 59.

Associated with the head carriage are three switches. One switch 104 closes when the head is in one extreme position called "home", a second switch 105 closes when the head is in the other extreme position called "away", and a third switch 116 closes at the half way point called "half-way". When the home switch 104 closes it sends a logic zero signal to an input to the latch 60 to cause it to set in one direction. When the away switch 105 closes it sends a logic signal to the other side of the latch 60 to set it in the other direction. Thus as the audio head assembly moves back and forth between its extreme positions the latch 60 assumes its two stable states. When the heads arrive at the home position it sets up in one state and remains there until it arrives at the away position. When the heads arrive at the away position it assumes the other state and stays there until the heads return to the home position.

The logic zero signal from the home switch is also provided at the inputs to the OR gate 62 so that when the home switch is closed the output line 6 of the OR gate 62 assumes a logical one. This home switch signal is also applied to one input of the OR gate 61 as is the signal from the away switch. Thus the OR gate 61 gives a logical one output at its output terminal when either the home switch 104 or the away switch 105 is closed. The signals from these two OR gates are used to operate four NAND gates 63, 64, 65 and 66. The gate 63 has one input from the latch 55 while its other input is from the OR gate 62. Thus if latch 55 is set, and the home switch closes, the NAND gate 63 has both inputs at logic one and gives a logic zero output at its terminal 11. In like manner if the latch 56 is set since its output provides an input to one terminal of the NAND gate 64 and its other input is from the OR gate 61, if either the home switch 104 or away switch 105 close, the NAND 64 will give a logic zero out at its terminal 11. Similarly latch 57 is associated with gate 65 and latch 58 with gate 66.

Each of the gates 63, 64, 65 and 66 are associated with corresponding latches 67, 68, 69 and 70. When output signals are generated by any of these gates the corresponding latch 67, 68, 69 and 70 become set. It will also be noted that these latches are wired in such a way, that an input to one of the latches on the set side is also applied to the reset side of the other three latches. As a consequence if any one of the four latches 67, 68, 69 or 70 become set, at the same time any of the other latches which may have been set become reset. The output signals from the gates 63, 64, 65 and 66, in addition to being used to set the latches 67 through 70 also go to a logical OR 71 and through this OR through an AND gate 72 to a further latch 73. As a consequence any time one of the four latches 67 through 70 become set the latch 73 also becomes set.

The five latches 67, 68, 69, 70 and 73 operate five relays namely K1 through K5. The relay contacts K1 switch head one, that is audio track one, to the audio amplifier 112. Similarly K2 switches head two, K3 head three and K4 head four. Thus the set state of any one of the latches 67 through 70 selects and determines which audio track will play through the audio amplifier 112. The latch 73 operates the relay K5 from its reset side, that is, the relay contacts of K3 will be closed any time the latch 73 is reset. If the latch 73 is set the relay contacts of K5 are open. The relay contacts K5 short out all the head circuits so that when the latch 73 is set the audio track will feed a signal to the amplifier 112 but when it is reset the audio signal is shorted out and the audio output will be quiet.

In summary then, the latches 55, 56, 57 and 58 can be selected by the card logic to cause the four audio tracks to play. The set state of these four latches is transferred through the gates 63, 64, 65 and 66 when the head carriage is at its extreme position in order to set the output latches 67 through 70 in order to select an appropriate sound track head. It will be noted that the latch 60, which consists of the NAND elements 74 and 75 is set and reset by signals from the home switch 104 and the away switch 105. A direct input from the home switch 104 goes to one input of the NAND gate 74. A signal is also fed through a large capacitor 125 from the home switch 104 input to an input of the NAND gate 75. In like manner a direct input from the away switch 105 goes to the NAND gate 75 and a capacitively coupled signal to the NAND 74. Since the inputs from the home switch 104 and the away switch 105 are logic zeros, a consequence of this capacitively coupled circuit is that when either switch closes both NAND gates 74 and 75 give a logic one output transient until the capacitor has become discharged. During the interval when the output of both the NAND gates 74 and 75 are a logic one, both inputs to the gate 76 become logic one and consequently the output at its terminal 11, becomes a logic zero. This signal provides the reset input to the latch 73. It can therefore be seen that when any one of the latches 67 through 70 becomes set, the latch 73 becomes set at the same time. Subsequently when the head carriage gets to the other extreme position that is either home or away, and the home switch 104 or the away switch 105 closes the signal from the gate 76 resets the latch 73.

Operation of the main drive motor M1 which moves the head carriage back and forth in playing the audio tracks is controlled by the latch 60 in combination with the latch 73. The two outputs from the latch 60 operate two relays K6 and K7. The contacts K6a and K7a of these relays switch the direction controlling input to the bi-directional main drive motor M1. A third relay K8 controls the other input of power to this motor M1 and is operated by a gate 77 which in turn receives a control input from the OR gate 78. The input terminal of the OR gate 78 receives a control input from an output of the latch 73. When the latch 73 is set, the gate 77 will ordinarily actuate K8 close contacts K8a causing the motor to run. As soon as the head carriage arrives at the far end of the track, the latch 73 resets and the relay contacts K8a open.

The latch 59 is used to initiate a card changing cycle. This latch becomes set either as a consequence of receiving a signal from the gate 54 or because the start button has been depressed. When the latch 59 is set it delivers a logic one output to one input of the NAND gate 79. Another input to the NAND gate 79 comes from the latch 73 and this input only becomes a logic one when the latch 73 is reset. A third input to the NAND gate 79 comes from an input from the "closed" switch 81, which input becomes a logic one when the platen is in the closed position. Thus when a card is in the machine and the platen is closed and the machine is playing a track and the latch 59 becomes set the gate 79 will only give a logic zero output when the latch 73 resets at the end of the audio playing operation. At that time, however, this logic zero output causes the latch 80 to set. Thus latch 80 in set state energizes relay K9 to close contacts K9a of that relay and operate the platen motor M2. The platen motor M2 operates the cam rod in the mechanism to open the platen and in doing so it opens switch 81 to remove the "closed" input signal and closes switch contact 82 when the platen has opened all the way, opens switch 83 to disconnect the home switch 104 and away switch 105 associated with the head transport mechanism and closes switch contact 84 to connect in two further switches called "in" switch 90 and "out" switch 89. As previously stated the out switch 89 is associated with the pinch rollers and closes at the time the card leaves the operating station and is fed into the top of the stack of cards. The in switch 90 is associated with the barrier and closes when a new card is in position.

It will be noted that a further output from the gate 79 is fed to the NAND gate 74 of the latch 60 to set it to the away state. It will further be noted that an output from the NAND gate 85 in the latch 80 provides an inhibit input to the gate 77. Thus as long as the latch 80 is set there will be no output from the gate 77 and the scan relay contacts K8a will remain open. When the platen is fully open, however, the switch 82 closes to provided an input signal to the terminal 88 which in turn operates the gate 86 to send a logic zero from its output terminal to one input terminal of NAND gate 85 to reset the latch 80. At the time the latch 80 resets, the inhibit on the gate 77 is removed and the scan relay contacts K8a closes to cause the main drive motor M1 to operate. Since the latch 60 was set to the away state at the time the latch 80 was set, the main drive motor M1 operates in the away direction and feeds a card out of the working station and into the card stacks. When the card is gone, however, the out switch 89 closes and this causes the latch 60 to change state and to reverse the drive motor M1. When the drive motor M1 reverses, the front of the card box rises and feeds a new card into the working station. Please refer to FIGS. 7, 8 and 9.

At the time the switch 82 closes to send an "open" signal to the terminal 88, the gate 91 sets the latch 87 which in turn resets the latch 59. The NAND gate 92 receives an input from the terminal 88 when the platen is open. It receives a further input from the output of the OR gate 62, which becomes a logic one when the in switch 90 closes and a third input from the set state of the latch 87. As a consequence when the new card is finally in position against the barrier and a signal is received from the switch 90, the gate 92 produces a logic zero output which sets again the latch 80. This causes the platen relay contacts K9a to close to operate the platen motor M2 to close the platen on the new card. When the platen is closed the gate 93 having inputs from the latch 87 and the "closed" input, which becomes asserted when the switch 81 closes, generates a logic zero output which resets the latch 80 thus stopping the platen motor M2.

The outputs from latches 67 through 70 are connected to the control points L10, L14, L18, L22, L24 and L26 on the platen. These are used in programming the sequence of operations on the card itself. It will be noted that all the basic operations of the system are carried out by inputs to the gates 50, 51, 52, 53 and 54. Each of these gates is a two input logical NAND gate, that is, they provide a zero output only when all of their inputs receive a logical one. Every operation is set in motion, therefore, by two concurrent conditions. These conditions may typically be the activation of a particular touch point as programmed on the card together with a specified state of the machine, for example, a particular track being active or the heads being in a particular position, such as in the home or away position.

It will be noted that the gate 92 which sets the latch 80 for the second time to close the platen, at the same time sends a signal to one input terminal OR gate 94 of the latch 55. Thus at the end of the card changing the latch 55 is set so that the machine automatically plays track number one immediately after a new card comes into position. In the event that the heads are not in the home position when a new card comes in, the main drive motor M1 will continue to run until the heads do get to this position. No transfer can take place through the gate 63, however, until the heads do arrive home. As a consequence the latch 73 does not become set until the heads are in a position to play track one. When the heads do come to that position the transfer through gate 63 takes place, the latches 67 and 73 set up and head one is switched into the audio amplifier. As track 1 plays and the heads move from the home to the away position the set state of latch 73 is used in conjunction with the half-way switch 116 to provide a signal input clear to terminal 95 which will reset the latch 55 and indeed any other one of latches 56, 57 or 58 or 87 which might be set. It will be further noted that the OR gate 78, which operates the gate 77 and as a consequence the relay K8 which runs the drive motor M1, receives inputs from the latch 73, the latch 55, the latch 59 and the latch 82. If any one of these latches are set, the heads continue to move until the program logic is satisfied.

Having discussed the mechanical and logical design of the apparatus and its operation under one typical set of conditions, its operation under other conditions in response to differently programmed cards will be apparent to those skilled in the art. It will be evident that the apparatus described has considerable flexibility in programming and in the ability to present various learning situations in a manner requiring rather elementary student response to progress through teaching material presented, at the students own pace and in a manner determined by the nature of his response.

In addition the construction of the machine is such that it may readily be operated with additional peripheral equipment from the contact points on the platen which are not utilized in the internal programming. Such peripheral equipment may include for example, counters for keeping a score of correct and incorrect answers or additional audio visual teaching aids.

While the invention has been described in terms of teaching cards with visual areas, it will be understood that the invention may be embodied in machines which use cards without visually displayed information. Cards, for example, in which the information is carried as braille and where the student senses the information by touch and manually depresses the choice area may be used.

What is claimed is:
1. A teaching machine comprising
a set of teaching cards each including directly sensible information on one surface thereof,
means for individually inserting said cards into sensing position,
tactile response means positioned with respect to a card in said sensing position such that depressing specific portions of the sensible information on said card results in said machine producing a further sensible response, and
wherein said card includes thereon a series of audio tracks and wherein the machine includes transducer means actuable to convert said audio tracks into audible signals, said tactile response means producing actuating signals to said transducer determining which of said audio tracks are used to produce the audible signals.

2. A teaching machine in accordance with claim 1 wherein said transducer means includes a plurality of sensing heads positioned to underlie specific ones of said audio tracks when one of said cards is in the sensing position and bi-directional driving means for driving said sensing heads along the audio tracks in either direction.

3. A teaching machine in accordance with claim 1 wherein said means for individually inserting said cards into a sensing position comprises, a tray for holding a vertical stack of said teaching cards, a transport mechanism for inserting the bottom one from said stack into said sensing position upon receipt of an actuating signal of a first type and for removing a card from said sensing position and placing it on the top of said stack in response to an actuating signal of a second type, said tray being pivoted such that, upon receipt of an actuating signal of said second type, the end of said tray nearest to said sensing position is vertically displaced downwardly to enable the card being returned from said sensing position to be placed on top of said stack.

4. A teaching machine in accordance with claim 1 wherein said teaching card is held in said sensing position in a vertically movable frame, said vertically movable frame having a first, upper position in which said transducer means are brought into operative contact with said audio tracks and said tactile response means are brought into operative contact with a surface of said teaching cards and a second, lower position which allows free movement of selected ones of said teaching cards from said set into the said sensing position and from said sensing position into said set.

5. A teaching machine comprising a set of flexible cards carrying visual information on one surface thereof, a first set of spaced electrical contacts on the opposite surface thereof underlying said visual information, a plurality of audio tracks on one of said surfaces, and a second set of electrical contacts selectively connected electrically to specific ones of said first set, means for storing a plurality of said cards and for transporting said cards in an ordered sequence one at a time to a viewing position, audio transducing means positioned to operatively engage said audio tracks when a card is in the viewing position circuit means within said machine including electrical contacts underlying said viewing position such that manual depression of specific portions of the visual information carrying areas of said card in viewing position provides circuit closures to control the sequencing of selection of audio tracks to be converted to audible signals and to control the removal from and insertion into the viewing position of said cards.

6. A teaching card comprising, a sheet of flexible material, a set of reproducible audio tracks recorded on said sheet in a first region thereof, a set of spaced electrical contacts printed on a second region of said sheet, a visual choice field graphically divided into a set of choice regions printed on a first side of said sheet in a third region thereof, a set of choice point contacts printed on a second side of said sheet opposite said first side, each choice point contact being located opposite a different one of said choice regions, and, a set of conductors printed on said sheet and interconnecting said choice point contacts and a set of said spaced electrical contacts to form a card carried teaching machine programming and control circuit.

7. A teaching machine comprising, means for moving a stack of teaching cards sequentially into and out of position at a viewing station, programmable audio reproducing means for reproducing audible information recorded on said cards, said programmable reproducing means comprising a first set of machine contacts adapted to register with a first portion of a card at said viewing station and a second spaced set of contact points forming an array positioned to register with a second portion of a card at said viewing station, a set of flexible teaching cards adapted to be mounted on said machine for manipulation thereby, each card having audio information recorded thereon and comprising on one side a visual choice field inscribed on and occupying an area adapted to overly said second portion and divided into a plurality of choice regions, and on the opposite side of the card, a set of choice point contacts each in a different one of said choice regions and adapted to engage a different one of the contact points in said array, a resilient insulating mask overlying said array for resiliently spacing a teaching card at said viewing position from said array, apertures formed in said mask exposing the contact points in said array, whereby selecting a choice point region on a card in viewing position by manually depressing the selected region will connect a choice point contact on said card opposite the selected choice point region to a mating contact point in said array, a second set of spaced terminal contacts formed on each card in position to engage said first set of machine contacts, and electrical connections on each card between the choice point contacts and selected ones of said set of terminal contacts to form a complete card determined manually sequenced program for the teaching machine when a card is in said viewing position.

8. A teaching machine in accordance with claim 7 wherein said card includes a number of discrete audio tracks and wherein said machine includes audio transducer means for sensing the signals on said tracks and converting said signals to audible signals, the sequence of playing of said audio tracks being controlled by said card determined manually sequenced program.

9. A teaching machine in accordance with claim 8 wherein manual depression of selected choice regions on said card connecting particular ones of said choice point contacts to particular ones of the contacts in said array, acts to operate a motor driving said audio transducer means to pass along said discrete audio tracks, the particular contacts connected determining which track is converted to audible signals.

10. A teaching machine in accordance with claim 9 and including a response signal light, said light being lit only when said audio means has completed its pass along said tracks thereby indicating that said machine is in condition for another manual selection.

11. A card for the presentation of information comprising a card member having, on a first side a first generalized area in which there is inscribed a visual choice field graphically divided into a set of choice regions, a set of choice point contacts formed on said card member opposite said first side, each opposite a different choice region bearing visual information, at least one reproducible sound track disposed in a second generalized area on said card and having audio information recorded on said track related to the visual information in said first generalized area, printed circuits disposed in a third generalized area on said card, and connections between said choice point contacts and said printed circuits defining a logical relationship between said visual information and said reproducible audio information.

12. The card of claim 11 wherein said choice field is subdivided into a rectangular grid array of sub-areas respectively bearing different visual information.

13. A teaching machine comprising,
sound reproducing means operable in a set of reproducing modes to produce for each mode a specific audible message,
an electrically conducting platen,
a first set of spaced electrical contacts,
means controlled by a predetermined set of electrical connections between said platen and ones of said first contacts for activating said sound reproducing means in particular ones of its several modes,
a resilient mask on said platen formed with apertures exposing a spaced set of points on said platen, and
a set of flexible teaching cards each inscribed on one side with a visible choice field graphically divided into a set of choice regions and formed on the other side with choice point contacts each adapted to engage said platen at a different point when the card is placed on the platen and the associated choice region is depressed,
said card having a plurality of audio tracks on one of said surfaces having audio messages to be reproduced by said sound reproducing means,
a second set of spaced contacts on said card adapted to engage said first set of contacts, and printed circuit connections on each card between said choice print contacts and said second set of contacts to form a student actuated program for the teaching machine when the card is placed on the platen.

14. A teaching machine for use with a set of flexible teaching cards having on one surface visible choice fields divided into a set of choice regions and on the opposite surface a set of electrical contacts, said card also having audible information recorded on one of said surfaces, said machine comprising,
means for moving individual ones of said set of said teaching cards sequentially into and out of position at a viewing station,
programmable reproducing means comprising a first set of electrical contacts positioned to register with a first portion of a card at said viewing station and a second spaced set of electrical contacts forming an array positioned to register with a second portion of a card at said viewing station and an audio read out element positioned to be in operative contact with the audible information recorded on said teaching cards when said cards are in position at said viewing station.

15. A machine in accordance with claim 14 and including circuit means responsive to the closure of contact points from said second set of spaced contacts and electrical contacts on a card in said viewing position to control the programmable audio reproducing means.

* * * * *